US009977826B2

(12) United States Patent
Gorelick et al.

(10) Patent No.: US 9,977,826 B2
(45) Date of Patent: May 22, 2018

(54) COMPUTERIZED METHOD OF GENERATING AND ANALYTICALLY EVALUATING MULTIPLE INSTANCES OF NATURAL LANGUAGE-GENERATED TEXT

(71) Applicant: Cloudera, Inc., Palo Alto, CA (US)

(72) Inventors: Micha Gorelick, Brooklyn, NY (US);
Hilary Mason, New York, NY (US);
Grant Custer, Brooklyn, NY (US)

(73) Assignee: Cloudera, Inc., Palo Alto, CA (US)

( * ) Notice: Subject to any disclaimer, the term of this patent is extended or adjusted under 35 U.S.C. 154(b) by 0 days. days.

(21) Appl. No.: 14/918,605

(22) Filed: Oct. 21, 2015

(65) Prior Publication Data
US 2017/0116327 A1    Apr. 27, 2017

(51) Int. Cl.
G06F 17/27    (2006.01)
G06F 17/30    (2006.01)
G06F 17/24    (2006.01)
G06F 17/28    (2006.01)

(52) U.S. Cl.
CPC ...... *G06F 17/30684* (2013.01); *G06F 17/248* (2013.01); *G06F 17/278* (2013.01); *G06F 17/2755* (2013.01); *G06F 17/2881* (2013.01); *G06F 17/30241* (2013.01)

(58) Field of Classification Search
CPC .......................... G06F 17/2881; G06F 17/248
See application file for complete search history.

(56) References Cited

U.S. PATENT DOCUMENTS

| 5,721,938 | A | 2/1998 | Stuckey | |
|---|---|---|---|---|
| 8,355,903 | B1* | 1/2013 | Birnbaum | G06F 17/24 704/1 |
| 9,411,804 | B1* | 8/2016 | Kaeser | G06F 17/2881 |
| 9,436,681 | B1* | 9/2016 | Tunstall-Pedoe | G06F 17/289 |
| 2011/0282892 | A1* | 11/2011 | Castellani | G06F 17/30389 707/766 |
| 2011/0289088 | A1* | 11/2011 | Yarin | G06F 17/30781 707/738 |
| 2012/0254188 | A1* | 10/2012 | Koperski | G06F 17/30663 707/740 |
| 2014/0149107 | A1* | 5/2014 | Schilder | G06F 17/2881 704/9 |

(Continued)

OTHER PUBLICATIONS

Bangalore et al., "Evaluation metrics for generation" Proceedings of the First International Conference on Natural Language Generation, vol. 14: pp. 1-8 (2000).

(Continued)

*Primary Examiner* — Pierre-Louis Desir
*Assistant Examiner* — Yi-Sheng Wang
(74) *Attorney, Agent, or Firm* — Perkins Coie LLP

(57) ABSTRACT

A computerized method for generating and evaluating natural language-generated text involves receiving, in a computer, data input by a user, generating, using a natural language generation technique, multiple instances of text stories based upon both contents of a corpus and the received data; analyzing the multiple instances of text stories as a weighted combination of computed geographic scores, distance scores, information content scores, replacement scores and extra aspect scores, providing a ranked set of the generated text stories to a user, receiving a selection of one of the text stories in the ranked set, and storing the selected story.

19 Claims, 7 Drawing Sheets

(56) References Cited

U.S. PATENT DOCUMENTS

2015/0261745 A1* 9/2015 Song ................ G06F 17/2881
704/9

OTHER PUBLICATIONS

Barzilay et al., "Collective content selection for concept-to-text generation" Proceedings of the Conference on Human Language Technology and Empirical Methods in Natural Language Processing, pp. 331-338 (2005).
Clark et al., eds., "The Handbook of Computational Linguistics and Natural Language Processing" Wiley-Blackwell Pubs (2013).
Dale et al., "Using natural language generation in automatic route description" Journal of Research and Practice in Information Technology, vol. 37.1: pp. 89-105 (2005).
Hovy, Eduard, "Generating natural language under pragmatic constraints." Journal of Pragmatics, vol. 11.6: pp. 689-719 (1987).
Klein, "How to Edit 52,000 Stories At Once," ProPublica (https://www.propublica.org/nerds/item/how-to-edit-52000-stories-at-once) (Jan. 24, 2013).
Konstas et al., "Concept-to-text generation via discriminative reranking" Proceedings of the 50th Annual Meeting of the Association for Computational Linguistics: Long Papers, vol. 1: pp. 369-378 (2012).
Reiter, Ehud, "NLG vs. templates" Proceedings of the Fifth European Workshop on Natural Language Generation, pp. 95-105 (1995).
Reiter, Ehud et al., Building Natural Language Generation Systems. Cambridge, MA: Cambridge University Press (2000).
Reiter, Ehud et al., "Choosing words in computer-generated weather forecasts" Artificial Intelligence, vol. 167.1: pp. 137-169 (2005).
Romenesko, Jim, "sportswriting-robot-doesnt-know-that-little-league-star-mone-davis-is-a-girl ("http: //jimromenesko.com/2014/08/16/sportswriting-robot-doesnt-know-that-little-league-star-mone-davis-is-a-girl/), Aug. 16, 2014.
Roose, Kevin, "Robots Are Invading the News Business, and It's Great for Journalists" New York magazine, Jul. 11, 2014.
Simplenlg Project, Wiki Section 12, https: //code.google.com/p/simplenlg/wiki/Section12 (Updated May 30, 2011).
Van Deemter et al., "Real versus template-based natural language generation: A false opposition?" Computational Linguistics, vol. 31.1: pp. 15-24 (2005).
Wang et al., "Language modeling using a statistical dependency grammar parser" Proceedings of the IEEE Workshop on Automatic Speech Recognition and Understanding, pp. 519-524 (2003).
Williams, Sandra, "Natural language generation (NLG) of discourse relations for different reading levels" Dissertation, University of Aberdeen, (2004).
Yu, Roger, "How robots will write earnings stories for the AP" USAToday Jun. 30, 2014.
Natural Language Generation Group @ The Open University (http: //mcs.open.ac.uk/nlg/) last updated Jun. 2010.
Association for Computational Linguistics (http: //www.aclweb.org/siggen) retrieved Sep. 2015.
Natural Language Generation @ University of Aberdeen (http: //www.abdn.ac.uk/ncs/departments/computing-science/natural-language-generation-187.php) retrieved Sep. 2015.
Spoken Language Systems @ MIT (http://groups.csail.mit.edu/sls/technologies/gen.shtml) copyright 2013.
Human Media Interaction @ University of Twente (http://hmi.ewi.utwente.nl/Publications) retrieved Sep. 2015.
Computational Language and Language Technology @ Ohio State University (http://www.ling.ohio-state.edu/cllt/) retrieved Sep. 2015.
Center for Computational Learning Systems @ Columbia University(http://www.ccls.columbia.edu/) retrieved Sep. 2015.
NWO Vici Project @ Tilburg University (http://bridging.uvt.nl/) retrieved Sep. 2015.
Narrative Science FAQ (http://www.narrativescience.com/) retrieved Sep. 2015.
Automated Insights FAQ (http://automatedinsights.com/) retrieved Sep. 2015.
Automated Insights Free Real Estate whitepaper access (http: //automatedinsights.com/real-estate-whitepaper/) retrieved Sep. 2015.
Arria (http: //www.arria.com/) retrieved Sep. 2015.
Yseop (http: //www.yseop.com) retrieved Sep. 2015.
Linguastat Marquee (http: //www.linguastat.com/) retrieved Sep. 2015.

* cited by examiner

COMPUTERIZED METHOD OF GENERATING AND ANALYTICALLY EVALUATING MULTIPLE INSTANCES OF NATURAL LANGUAGE-GENERATED TEXT

BACKGROUND

1. Field

This disclosure relates generally to data processing, and, more particularly, to automated data processing of textual data.

2. Background

Natural language generation (NLG) of text has been a high growth area in the recent past. Companies such as Narrative Science, Automated Insights, ARRIA, and Linguastat have created various systems that can generate text "stories" from rich, structured, well-understood data sets, for example, reported company financials, sales analytics, sports box scores and statistics, sensor readings, weather information, and product SKUs. Other companies, such as Yseop have developed systems that are more interactive, using structured questions to elicit responses that can be used to provide desired or relevant information in response.

Such systems however, due to their structural nature, generate from the input some form of highly structured output story that is hard to differentiate from every other story generated by that same system. However, since the intent of such "stories" is largely to convey the data in narrative form, the narrative is of relatively minor importance.

To the extent the narrative is of increased importance, or of primary importance, the above-referenced systems are largely incapable of varying the content resulting from the exact same data, i.e., without other action multiple runs using identical data will generate the same "story" each time.

In an attempt to overcome that issue, one company, Linguastat, takes its NLG result handling a step further. The Linguastat product, called Marquee, generates titles and descriptions for a retailer's products using NLG techniques and then uses performance metrics to rewrite those titles and descriptions to try to hone in on the title and description that generates the most interest or sales for each media channel, e.g., web, mobile, etc. One major drawback of such a system is that it relies upon "after the fact" information, e.g., clicks or sales data, to make the changes. As a result, such reactive adaptivity can result in inconsistency of presentation and confusion, for example, a user may check the description of a product several times over time before buying, but may find that each time they go to the same product, the description may be somewhat different.

Moreover, even introducing human intervention into the process to review or edit the resulting NLG output cannot address the foregoing issues for at least two reasons. First, the very purpose of NLG is to minimize the human aspect of the process of text generation. Second, human intervention would merely add a subjective component to the process yielding results that would differ based upon the individual reviewing and might even might be inconsistent for the same editor/reviewer depending upon factors unique to that editor/reviewer, e.g., time of day, mood, time lag between reviews, intervening reviews of other NLG output, etc.

Thus, there is an ongoing technical problem present in the art in that current systems and methods are incapable of generating multiple versions of stories from the identical data or, to the extent they can by modifying a generated story, they lack the ability to automatically, prospectively, consistently and repeatably evaluate a particular output of an NLG system relative to any other different output it might generate.

BRIEF SUMMARY

The current disclosure describes a computerized method for generating and evaluating natural language-generated text.

One variant of the method involves receiving, in a computer, data input by a user, the received data to be used to generate multiple different story instances. The method also involves accessing a corpus stored in non volatile storage, using a processor of the computer. The method further involves generating, using a natural language generation technique, multiple instances of text stories based upon both contents of the corpus and the received data. The method then involves analyzing each of the multiple instances of text stories by computing a geographic score using the processor, computing a distance score using the processor, computing an information content score using the processor, computing a replacement score using the processor, and computing an extra aspect score using the processor. The method additionally involves, for each of the multiple instances of text stories, normalizing, using the processor, each of the computed geographic score, the computed distance score, the computed information content score, the computed replacement score, and the computed extra aspect score, to a common scale so as to obtain, for each of the multiple instances of text stories, a normalized geographic score, a normalized distance score, a normalized information content score, a normalized replacement score, and a normalized extra aspect score. Next, the method involves applying, using the processor, a first weighting factor to all of the normalized geographic scores of each of the multiple instances of text stories to obtain weighted geographic scores, applying, using the processor, a second weighting factor to all of the normalized distance scores of each of the multiple instances of text stories to obtain weighted distance scores, applying, using the processor, a third weighting factor to all of the normalized information content scores of each of the multiple instances of text stories to obtain weighted information content scores, applying, using the processor, a fourth weighting factor to all of the normalized replacement scores of each of the multiple instances of text stories to obtain weighted replacement scores, and applying, using the processor, a fifth weighting factor to all of the normalized extra aspect scores of each of the multiple instances of text stories to obtain weighted extra aspect scores. Then, the method involves, using the processor, computing a total score for each of the multiple instances of text stories from the respective weighted geographic score, weighted distance score, weighted information content score, weighted replacement score, and weighted extra aspect score. The method also involves generating, for display on a screen associated with the user, an ordered set of the multiple instances of text stories ordered, using the processor, ranked according to their total score; receiving from the user, at the processor, a selection of one of the displayed instances of text stories in the ordered set; and creating a file in the non-volatile storage containing the selected one of the displayed instances of text stories.

Another variant of the method involves i) receiving data provided by a user to be used in an NLG story generation process, the user-provided data reflecting aspects desired by the user to be included in a story instance; ii) generating, using a processor of a computer, a story template, the story template being configured to have sentence templates inserted therein; iii) repeatedly adding sentence templates having, aspects including values, to the story template, using the processor, based upon aspects specified by the user-provided data until all the aspects have been incorporated; iv) repeating "ii)" and "iii)" to generate multiple story templates until a generation limit occurs; v) using the processor, creating story instances by replacing at least some of the values of the aspects in the sentence templates with values specified in at least some of the aspects desired by the user; vi) scoring each of the story instances according to a set of scores comprising a geographic score, a distance score, an information content score, a replacement score and an extra aspect score; vii) for each of the story instances, generating a total score as a weighted combination of the geographic score, distance score, information content score, replacement score and extra aspect score of the respective story instance; viii) storing the story instances and at least their associated total scores in non-volatile storage using the processor; ix) ranking the story instances according to their associated total scores using the processor; x) providing a set of the highest ranked story instances for display to the user using the processor; xi) receiving a selection of one of the provided story instances; and xii) maintaining that selected one of the provided story instances in the non-volatile storage while deleting all non-selected story instances.

Advantages of the foregoing methods include the ability to compare multiple versions of text generated from the same information.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

The current disclosure describes a system and method for generating and evaluating natural language-generated text. The system and method will be described below, first in an overly simplified manner for overview purposes only, and then in more detail.

For purposes of use herein, the terms "story" and "text story" are expressly intended to interchangeably mean a unit of text made up of multiple text sentences or phrases, and, in some cases, containing numerical values as well, relating to some location-dependent information, for example, a real estate advertisement, a dating profile or advertisement, a local shopping item (e.g., store or garage sale advertisement) or other location-related item (e.g., local sales promotion, local news reporting detailing accident reports and/or 911 calls).

In simplified overview of the method, for purposes of general understanding only, natural language generation (NLG) is performed using templates derived from individual components of a corpus of information. Certain information in the templates are tagged to enable the tagged information to be changed in response to received user input. In response to user input, multiple templates from the corpus are used to generate multiple text stories, all based upon the same user input. Then, each text story is scored using multiple different unique scoring formulas designed to, in combination, represent an objective value by which each text story can be measured against the other text stories. The results of the scoring are then normalized, and combined in a weighted fashion, to obtain a total score for each story. Then, at least the stories with the highest ranking(s), based upon total score, can be displayed to the user in ranking order. The user can then select a story from among the displayed stories and the selected story will be saved in storage for use by the user.

The method is implemented using a combination of computer hardware and software programming that collectively implement the inventions claimed herein.

Figure 1:
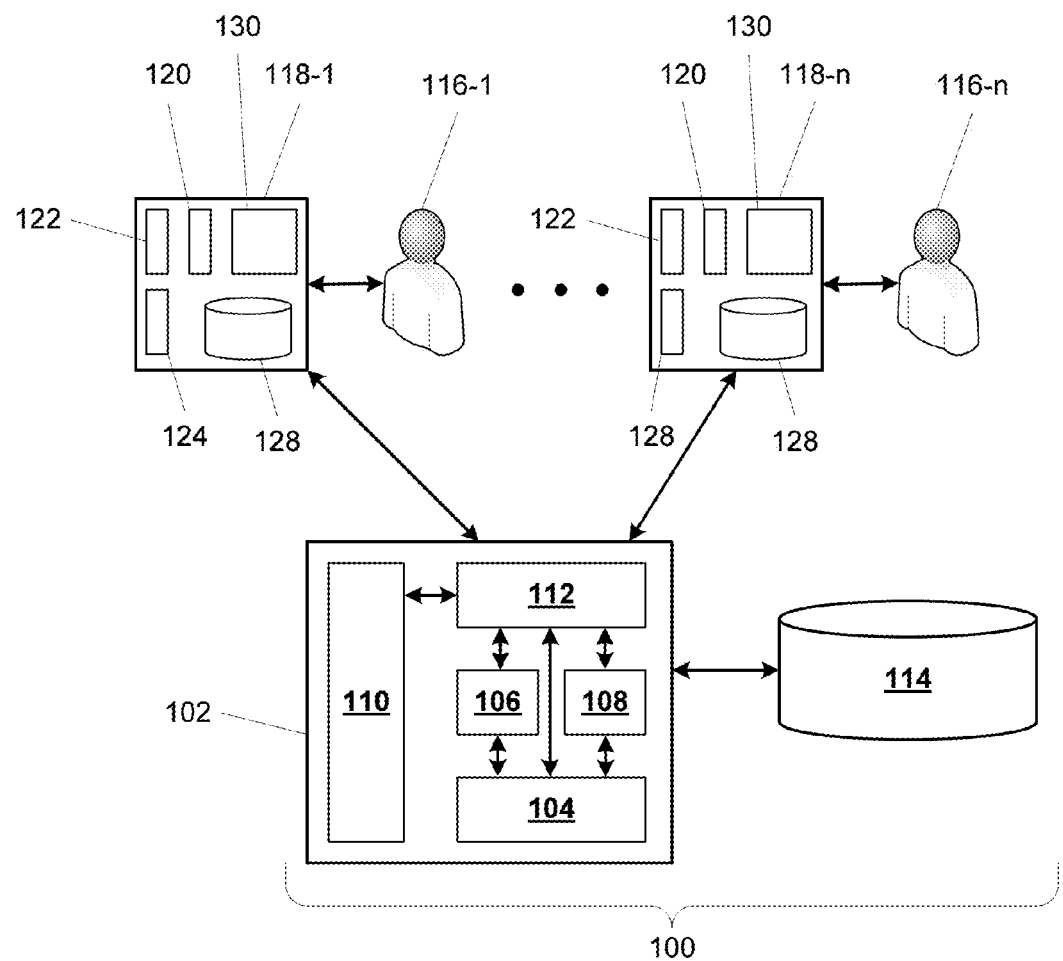
FIG. 1 illustrates, in simplified form, an overview of a system incorporating one example implementation version of the methods described herein.

FIG. 1 illustrates, in simplified form, an overview of a system 100 incorporating one example implementation version of the methods described herein. As shown, the system 100 is made up of a computer device 102, for example one or more of, a mainframe computer, a minicomputer, a server, a desktop computer, or any other computing device capable of performing the operations and calculations described herein. Although shown as a single device, the computer device 102 can alternatively be a distributed computer device. The computer device 102 conventionally includes one or more processors 104, RAM 106, ROM 108, non-volatile program and data storage 110 and auxiliary hardware 112 for input/output (I/O), printing and/or other computer functions. The processor(s) 104 of the computer device 102 operates under control of programming stored in the program and data storage 110 to implement the operations described herein. The computer device 102 is communicatively coupled to non-volatile storage 114, so that it can retrieve information from, and store information into, that non-volatile storage 114. Depending upon the particular implementation, the non-volatile program and data storage 110 and non-volatile storage 114 can be part of the same physical device, or they can be distributed, for example, in an array of physical storage devices or they can be in physical storage devices that are wholly separate from each other.

The computer device 102 is also configured to be accessed by user(s) 116-1, ..., 116-n for example, using an internet browser or dedicated program, and to accept input from the user(s) 116-1, ..., 116-n that will be used to generate multiple text stories using the corpus contents and evaluate those text stories as described herein. The user(s) 116-1, ..., 116-n will communicate with the computer device 102 using their own computer 118-1, ..., 118-n which may be, for example, a desktop computer, a laptop computer, a tablet computer, a smart phone, a smart watch, a gaming console, with associated processor(s) 120, RAM 122, ROM, 124, I/O 126, non-volatile storage 128, and a screen 130 via which they can view the user interface via which a user 116 can provide input or view text stories resulting from the methods described herein.

Having described the various hardware components that are used to construct variants of the system and method described herein, the operation of the system and methods will now be described in detail, first by component parts and then tying them all together. This will be done, for example purposes only, with reference to a real estate advertisement generation variant, although (as noted above) it should be understood that the following can equally be used to generate and analyze other location-sensitive text stories.

The Corpus

A corpus configured for use herein is made up of numerous text units relevant for the particular application that have been collected and stored in non-volatile memory. For example, in the case of a real estate application, the corpus would be made up of numerous (at least hundreds and more likely thousands) of prior similar types of text units relating to apartment sales and rentals, Such examples in this context typically contain specific details of the apartment (i.e., address and/or general location, bedrooms, bath(s), possibly total square footage, as well as available amenities (doorman, elevator, includes parking, walk-up, in-building laundry, gym, pool, etc.), along with other "fluff," "puffery" terms such as, for example, beautiful, sunny, stunning, modern, pre-war, ornate, spacious, updated, etc.) or attraction terms, such as designer, architect, building, or brand names.

Thus, one example text unit in the corpus might read:

Located in the heart of the bustling shopping district, this updated 2 bedroom, 1 bath studio apartment has all the modern comforts, including a spacious kitchen island with built-in wall oven and microwave and refrigerator drawers. Large windows provide an expansive view of both the city and water. Indoor parking and utilities included. $780/month.

Another example text unit in the corpus might read:

This sunny 3 bedroom, 2 bathroom, condo is located in a prewar building on the city's trendy East Side. Ideally situated only blocks away from the river and major city landmarks. Boasting high ceilings, and located on an upper floor, this gem is ideal for entertaining, with a spacious 1,800 square foot open plan, updated high-end appliances and a large living room area with built in wall storage capable of accommodating a 60"television. The bedrooms have closet space to spare and the building features a 24 hour doorman, valet parking and indoor gym to round out this affordable luxury gem. $2,500/month plus utilities.

In general, the larger the corpus, in terms of number of discrete units, the better.

Template Generation

For the purposes described herein, "templates" are formed from the units of corpus content. Specifically, the corpus content units are broken up into their constituent sentences, and then those sentences are parsed and their components tagged such that all key aspects of the sentences, referred to herein as "Attribute" and "Entity" aspects, are handled. Note that, for most practical implementations, every template must contain at least one Entity aspect, since those represent the most important content of a generated story.

With the foregoing understanding in mind, the process of generating templates will now be described with reference to FIGS. 2A-2D.

Figure 2A:
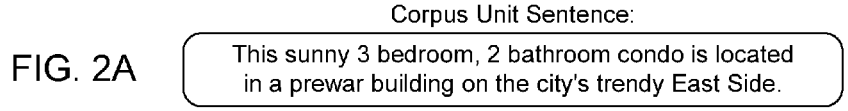
FIG. 2A is an example of a sentence parsed from a corpus text unit.

Specifically, FIG. 2A is an example of a sentence parsed from a corpus text unit, such as the example unit provided above, that will be made into a template for use with a variant described herein. The sentence is then scanned to identify terms and/or phrases that are recognized as an Entity or an Attribute aspect. Note here that an "Entity" is an aspect that is essentially a subjective descriptive or puffery term or a term that is either subjective, may not truly apply, or is not likely to be a critical misrepresentation to anyone who would view generated text containing it, even if it was not accurate. In contrast, an "Attribute" is an aspect that represents an objectively verifiable fact.

Figure 2B:
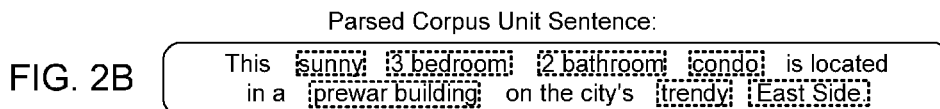
FIG. 2B is the sentence of FIG. 2A after it has been parsed.

FIG. 2B is the sentence of FIG. 2A after it has been parsed to identify "sunny," "3 bedroom," "2 bathroom," "condo," "prewar building," "trendy" and "East Side" as aspects to be tagged. Then each of those identified aspects are tagged as either an Entity or Attribute aspect.

Figure 2C:
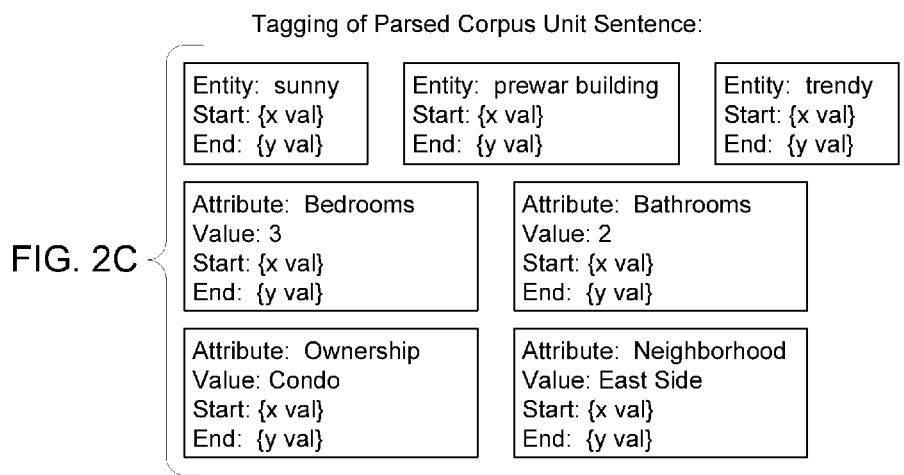
FIG. 2C illustrates, in simplified form, the tagging of the aspects identified as part of the parsing described in connection with FIG. 2B.

FIG. 2C illustrates, in simplified form, the tagging of the aspects identified as part of the parsing described in connection with FIG. 2B. As shown in FIG. 2C, the aspects "sunny," "prewar building" and "trendy" have been tagged as being Entity aspects, whereas "3 bedroom," "2 bathroom," "condo," and "East Side" have been tagged as Attribute aspects. In addition, the tagging of each of the Entity aspects includes identifying the starting and ending characters. For example, in the case of the Entity "sunny," it begins 5 characters into the sentence, and ends with the 9th character of the sentence. Note here that, with this example, spaces, and punctuation marks are counted as characters, however, other variants could ignore spaces and/or characters to the same effect, provided whichever approach was used was done consistently. This can be done for purposes of locating the aspect within the text unit or, in some cases the number of characters can also be used as part of the scoring.

The tagging of Attribute aspects involves identifying the value of the Attribute aspect and, similar to the Entity aspects, the starting and ending characters of the components of that aspect (e.g., word(s)).

Representative examples of Entity aspects for this variant could include, in addition to the above, but should not be considered limited to: "Name," (for the building or architect name), "Street" (for the street name), "Details" (for things like architectural style, band name of matching appliances, type of floor covering, etc.).

Representative examples of Attribute aspects for this variant could include, but are not intended to be in any way limited to, the above, as well as: "Floor Area," "Location" (which could be a longitude/latitude indication, a zip code, section/block/lot or other identifier), "Doorman," "Gym," "Elevator," "Parking," "Pets Allowed," "Utilities Included," etc. or a more general "Amenity."

In the case of either the "Attribute" or "Entity" aspect or both, the aspects can be, depending upon the particular implementation, a single layer arrangement or a hierarchical arrangement as appropriate to the particular implementation variant, with the hierarchy being, for example, the Entity aspect "Details" having sub-aspects of, for example, "Carpets," "Tile," and "Hardwood" instead of having separate Entity aspects of "Carpets," "Tile," and "Hardwood" or, in the case of Attribute aspects, one could have an aspect "Amenity" with two sub-aspects "In Building" and "Out of Building" with sub-aspects of "In Building" being, for example, "Laundry Room," "Parking Garage," "Auxiliary Storage," "Gym" and "Out of Building" being, for example, "Pool," "Valet," "Roof Deck" and "Near Subway." Additionally, the sub-aspects could, in turn, have their own sub-sub-aspects, for example, the sub-aspect "Laundry Room" could have its own sub-aspects of "In Basement" or "On Floor." The important point being that the configuration and arrangement be suitable for the particular implementation, not the specific named "Entity" and "Attribute" aspect names, their arrangement, or quantity.

Figure 2D:
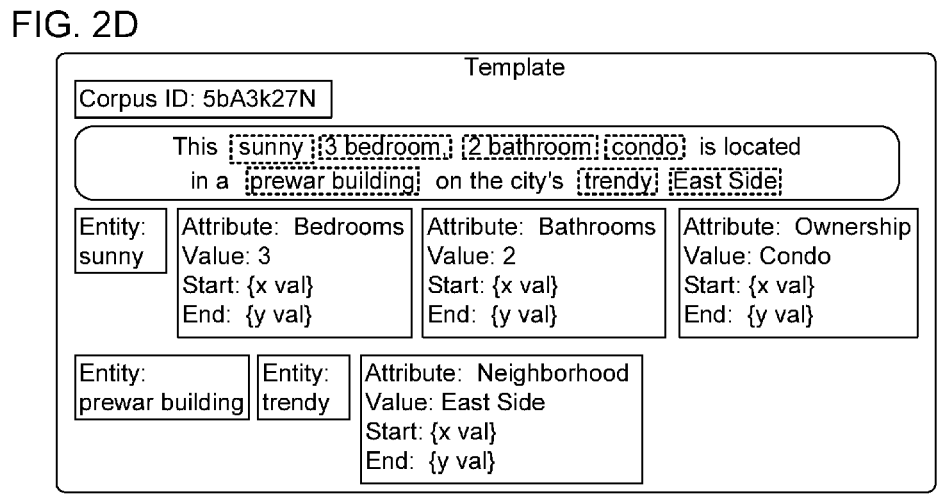
FIG. 2D illustrates, in simplified form, a functional representation of an example template constructed from the corpus sentence of FIG. 2A.

Finally, a template is created. FIG. 2D illustrates, in simplified form, a functional representation of an example template 200 constructed from the corpus sentence of FIG. 2A.

As shown in FIG. 2D, the template is made up of a number of functional components:

i) a "Corpus ID" indicating the particular text unit of the corpus from which the template came. Note here that all templates constructed from sentences of a given text unit will have the same Corpus ID. The reason for this will become apparent from the description below;

ii) the parsed sentence, which will have its value content modified in constructing a new sentence using the template and be used in performing some of the scoring as discussed herein; and iii) the tagged aspects, which will be used in the story generation process.

Once generated, templates are stored in non-volatile storage for later access and use in generating stories.

The User Interface

Figure 3:
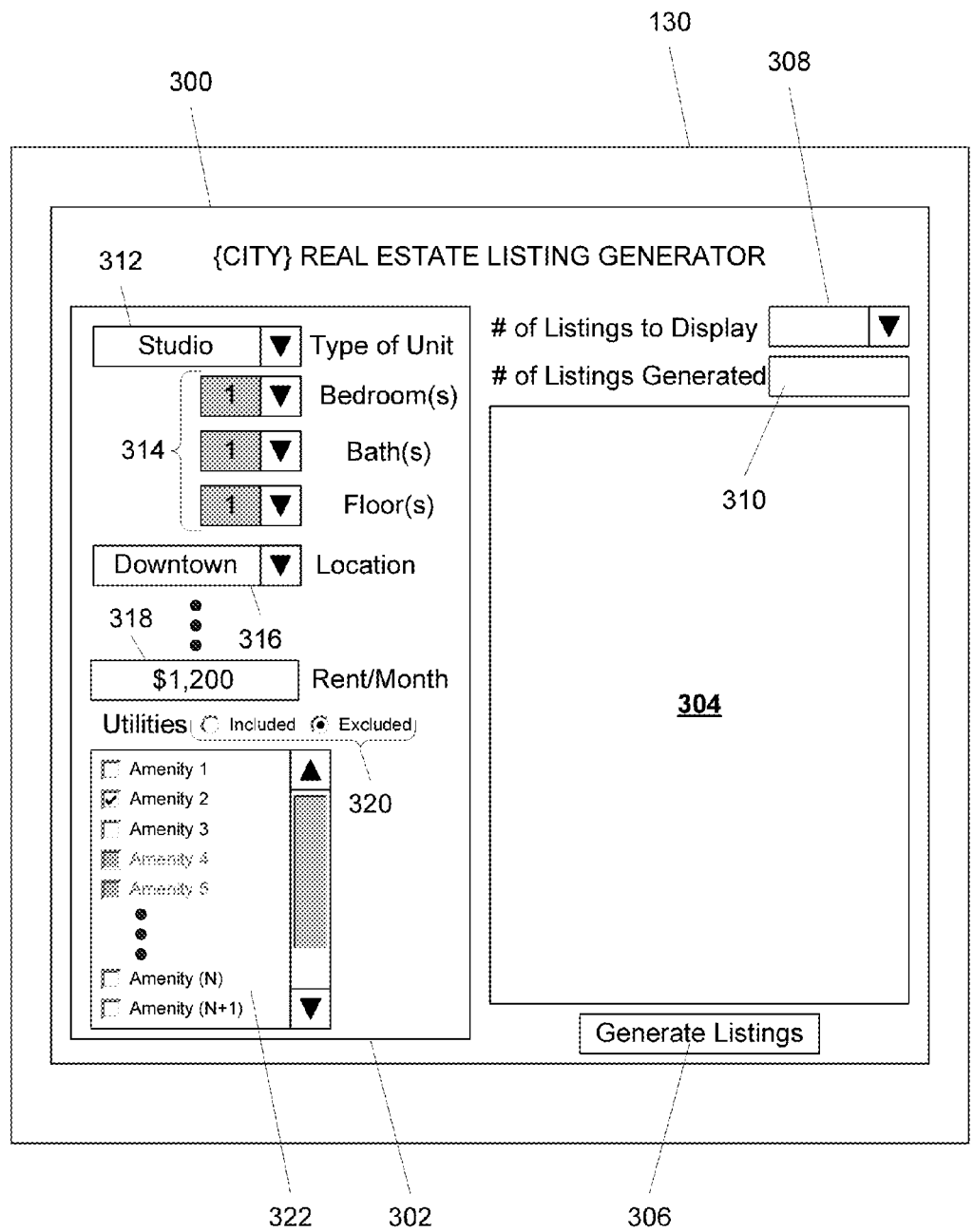
FIG. 3 illustrates, in simplified form, one example variant of a user interface for use with the example real estate variant described herein.

FIG. 3 illustrates, in simplified form, one example variant of a user interface 300, for use with the example real estate variant described herein, that would be displayed on the screen 130 of a computer 118 of a user 116 to allow the user 116 to specify information that would be used to use a system 100 of FIG. 1 implementing a variant that employs the NLG techniques described herein to generate multiple stories (in this example case, real estate rental listings within the {CITY} for which this variant is implemented) from the user-specified information and to automatically evaluate the generated stories using the scoring approaches described herein and provide some number of the generated listings to the user 116 for display via the screen 130.

As shown, the interface 300 includes an area 302 within which the user 116 can specify the pertinent information, an area 304 within which the generated listings will be displayed, a way to initiate generation of the listings, in this case a selectable button 306 labeled "Generate Listings" and, optionally, a place 308 where the user 116 can optionally limit the number of listings to be displayed (as described in greater detail herein) and an area 310 where the system 100 can identify to the user 116 the total number of listings that were generated and evaluated relative to each other.

Specifically, as shown, the area 302 includes a way 312 for the user 116 to specify the type of unit for which the listing should be generated, in this case a "Studio" apartment (in this example via a pull down menu), along with a way 314 for the user to specify the number of bedrooms, baths and floors. As shown in this example interface, since the user has selected "Studio" the selections of Bedrooms, Baths and Floors have automatically been set to 1 and are shown in grey because for the Studio selection, those values are fixed and no longer selectable. If however, the user had selected as the "Type of Unit" a different type, for example, "Condo," "Single Family House," "Townhouse," "Brownstone" or "Apartment" then they would have had the ability to specify a number of bedrooms, baths, and floors.

Likewise, the interface 300 provides a way 316 for the user to specify a general area where the studio apartment is located, a field 318 where the user 116 can specify the monthly rent, and a way 320 for the user to specify whether that rent number includes utilities.

Finally, the interface 300 includes an area 322 via which the user 116 can specify any applicable amenities that they would want to highlight. As shown, the user has selected the amenity indicated as "Amenity 2" and two of the amenities are shown greyed out because, based upon one of the other user selections, they are inapplicable. For example, they could have been for such amenities as a "basement" or a "mother-in-law suite" which would not be found in a studio apartment.

It should be appreciated that there are virtually infinite ways that an appropriate user interface 300 could be created and configured for use with the different variants described herein. As such, it is to be understood that the important point is the provision of a user interface, not the way it looks or its specific content, which will be a function of the implementation variant and interface designer. Moreover, it should be recognized that, for some implementations, the user interface 300 could be set up to accept different input sets at multiple times (and possibly from multiple users) before any stories are generated from those inputs (i.e., it will be a batch mode-type operation).

As will now be described, the inputs provided by the user 116 will be used, in conjunction with the templates and corpus described above to generate multiple stories, in this example case, real estate listings.

Story Generation

Figure 4:
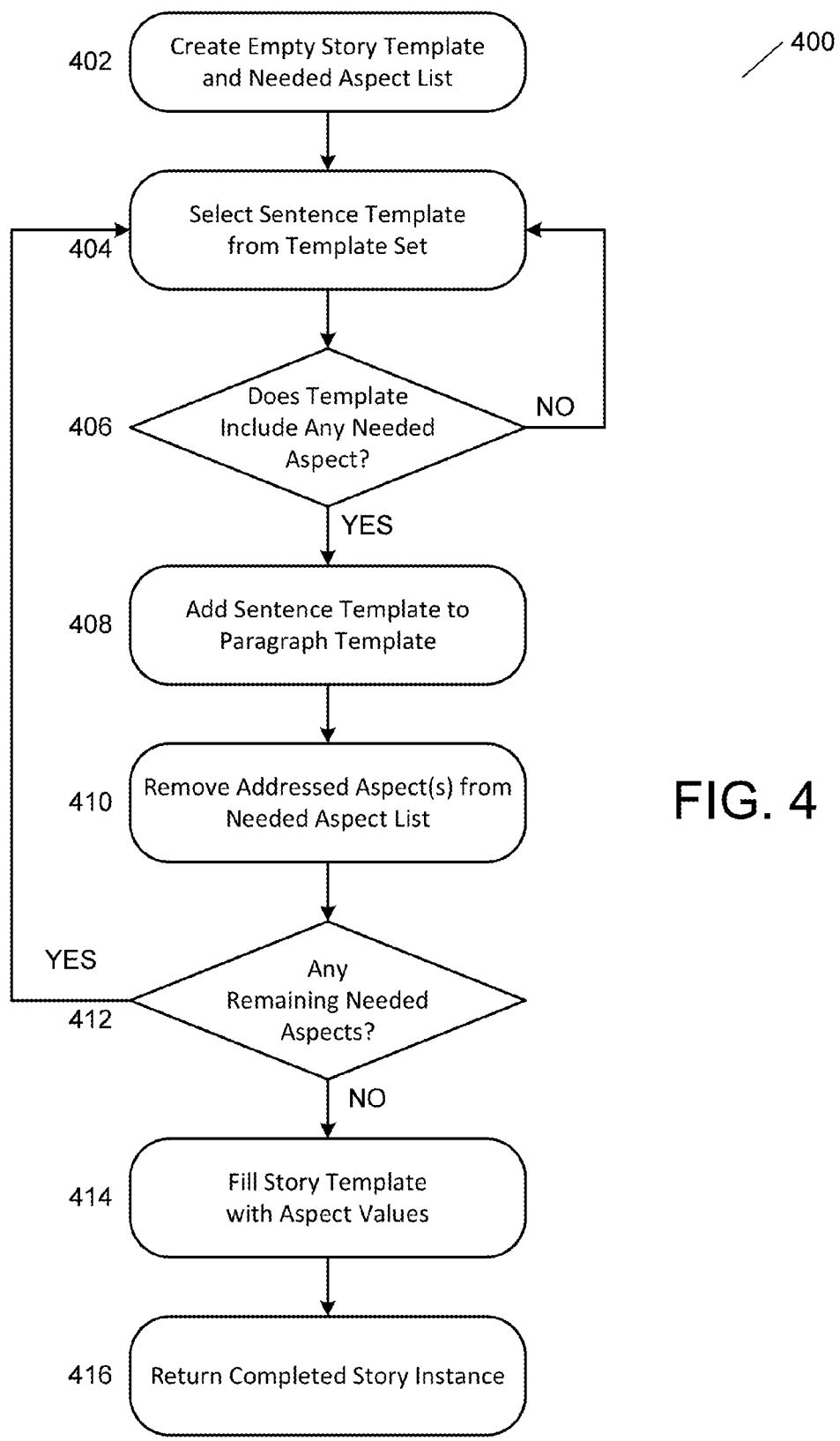
FIG. 4 is a simplified flow chart illustrating the process by which each instance of a story is created.

FIG. 4 is a simplified flow chart 400 illustrating the process by which each instance of a story is created. For purposes of this explanation, it is to be presumed that a user 116 has already provided the relevant information and aspects that will be used to generate the stories and has triggered the story generation process. The process begins with the creation of an empty story template and a needed aspect list (Step 402), which are data structures that will be used to build an individual instance of a story and track inclusion of needed aspects. Next, a sentence template is selected from among the pool of available templates (Step 404). Depending upon the particular implementation and number of templates, the initial pool need not be the entire universe of available templates. Rather, it may be desirable to reduce the pool of available templates by automatically excluding some subset of templates. For example, if a user selected "studio apartment," templates created from corpus units relating to single family houses, brownstones, and townhouses could be automatically excluded, or the universe of usable templates could be limited to those derived from corpus units relating to "similar enough" comparables, for example 1 or 2 bedroom apartments. In any event, a sentence template is selected, which may be done, for example, randomly, by starting with a specific template and then skipping templates thereafter according to some pattern that changes after each generation "run", or simply by starting with the first template in the pool and proceeding from there (although this last approach can reduce the effectiveness of the approach because it would reduce the variance between different runs involving identical inputs), and it is checked to determine if it includes any aspect (Entity or Attribute) that is needed (Step 406), based upon the user input. If not, that template is ignored and the process returns to Step 404 to get a new template.

If the template does include one or more needed aspects, then that template is added to the story template (Step 408) and all needed aspects that were included in the most recently stored template are then handled in the needed aspect list (Step 410) by, depending upon the particular implementation, removing them from the list, setting or clearing a flag associated with those aspects, or such other technique as may be appropriate, the important concept being that once an aspect has been included in a sentence of a story, it should not intentionally be included again in another sentence for the same story, not the manner in which that inclusion is tracked.

Next, the needed aspect list is checked to determine if there are any remaining aspects (i.e., that have not yet been included) (Step 412). If there are, the process returns to Step 404 and continues until all aspects have been included.

Once all aspects have been included, then all aspect values input, or selected, by the user 116 that differ from the values originally in the template are changed (Step 414). For example, if the template value for bathrooms is "3" but the input value was "2" that would be changed. Likewise, if the input value for square footage was "1,200" but the template sentence value was "1, 400" that would be changed. However, if the input bedroom number was "2" and the template value is also "2" then that value would not be changed. Of course, as a programming expedient, even where the values are the same, the new value could be written in place of the existing value, since the scoring process described below only cares about any actual difference between the template values and input values, not whether a value was overwritten with the same value.

At this point, the generation of a story instance is complete and the completed story is "returned" for later use in the scoring process (Step 416) (e.g., it may be temporarily stored in the non-volatile storage 114 (which will typically be the case) or, if sufficient RAM or other volatile storage is available, it can be temporarily maintained there).

Figure 5:
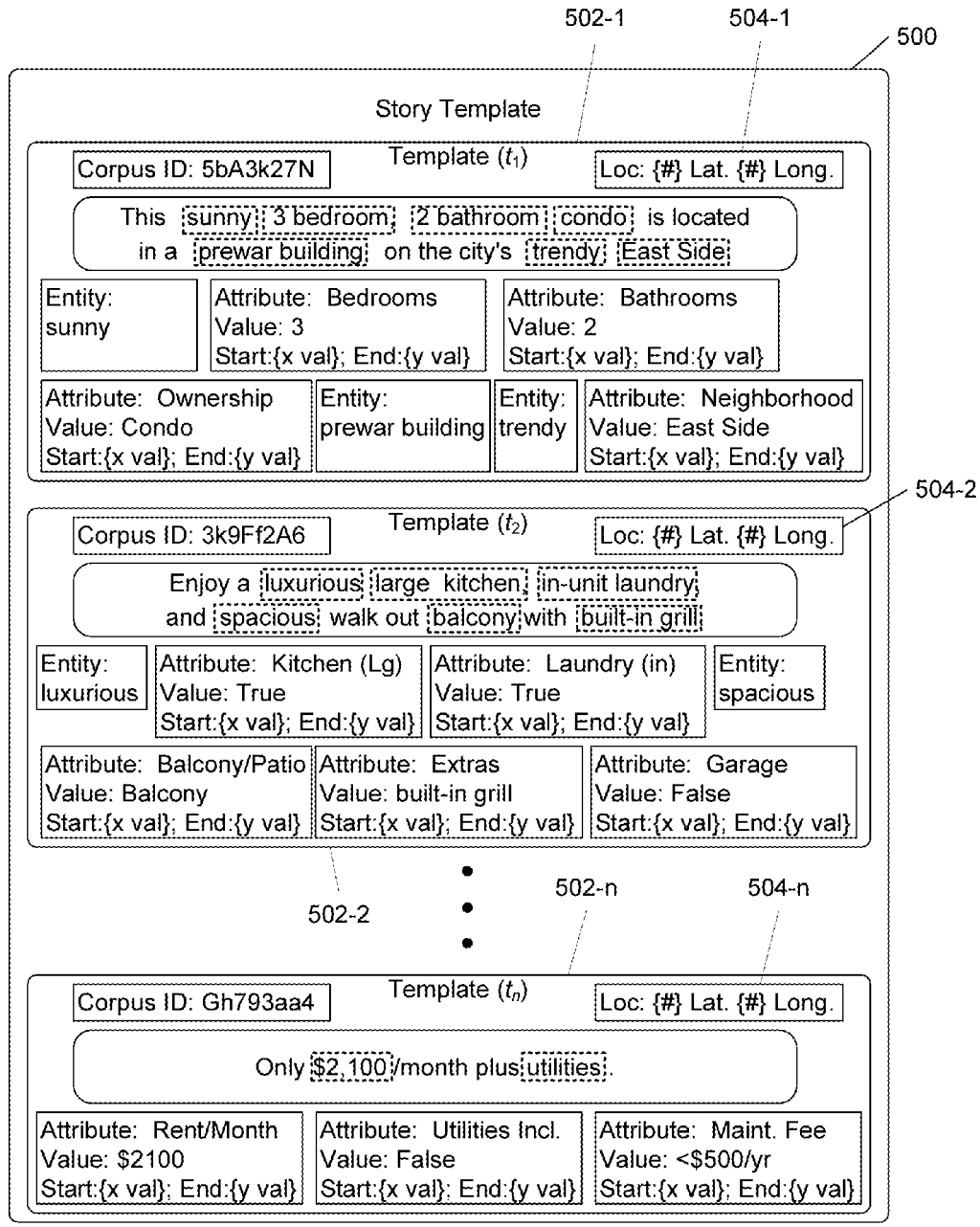
FIG. 5 illustrates, in simplified form, one example of a story template generated from multiple sentence templates.

FIG. 5 illustrates, in simplified form, one example of a story template 500 generated from multiple sentence templates $t_1, t_2, \ldots, t_n$ as would exist immediately prior to performing Step 414 of FIG. 4. As shown, the story template 500 is made up of multiple sentence templates ($t_1, t_2, \ldots, t_n$) 502-1, 502-2, . . . , 502-n. The displayed sentence templates 502-1, 502-2, 502-n come from different corpus units, as evidenced by their different Corpus IDs. In addition, as shown, each sentence template also includes (through inheritance) the latitude and longitude 504-1, 504-2, . . . , 504-n of the respective property in the corpus unit from which it came.

Note here that, the second sentence template 502-2 includes an Attribute aspect of "Garage" even though garage is not mentioned in that sentence, that is because the user may have input a desire for a garage, but the template came from a corpus unit representing a condo that does not have garages. Likewise, the last template 502-n includes an Attribute aspect for a Maintenance Fee of less than $500 per year, even though the user specified nothing about a maintenance fee, because the corpus unit this template was created from also had a sentence specifying a maintenance fee of less than $500 per year.

In general, it is to now be understood that other Attribute aspects could be included in a given template, based upon what was in the corpus unit from which it came and the user's input (e.g., because a user specified it and the corpus unit expressly indicated it was present or not present), irrespective of whether that Aspect actually appears in the specific sentence template.

At this point it should be also noted that there could be some redundancy in the sentences making up the story, notwithstanding the elimination of needed aspects once used. This is because a given sentence template might include, for example, the needed aspect "Gym" and also include the needed aspect "Doorman" and a later used template needed for "Elevator" might also include the aspect "Doorman" even though "Doorman" was previously removed from the needed aspect list and was not intentionally included. Although redundancy can optionally be handled at this stage, for example, by maintaining a slightly different needed aspect list that includes an indication that an aspect has already been used, such that a template that includes both a needed aspect and one or more used aspects will be skipped unless there are no other templates that do not include both the needed aspect and one or more used aspects. Alternatively, as will be described in greater detail below, the redundancy can be handled through the scoring process whereby greater redundancy results in a lower score. Likewise, some variants can optionally employ a mechanism as part of the process such that, for example: a) if a particular template cannot be used in generating a story instance, because it does not include any needed aspects, then it can be ignored or excluded for all subsequent story generations that are part of that user-triggered story generation "run," thereby reducing the amount of useless processing that needs to be done, or b) to check for non-unique sentences and maintain a non-unique iteration count such that, if there are more than "x" instances (where "x"=some pre-specified numerical limit) of a given sentence, then no further use of that sentence will be allowed.

The non-unique iteration count can optionally also be employed on a story basis such that, once a story is generated, it is checked for uniqueness against all other previously-generated stories. If it is not unique, the duplicate story is eliminated and the counter changed to reflect that instance. If more than some pre-specified number on non-unique stories are generated, the system 100 can take a pre-specified action ranging from ending the story generation process to changing the manner or order in which sentence templates are selected, to any other desired approach in between.

Once the stories have been generated, scoring can commence. Of course, at this point it is worth noting several points.

First, while the above process has been used to generate the stories, the remainder of the process does not require story generation be performed in the above manner. As long as the information that is needed to perform the unique scoring process described herein is available, other NLG techniques (whether currently known or later-developed) capable of generating multiple different stories from a common data set and corpus can be used in place of the foregoing. Indeed, one advantage of the scoring process described below is that, provided the needed information is available, stories generated from the same data using different techniques can be analyzed.

Second, the above process can be further streamlined through an optional separate process that checks all sentence templates against all others for a degree of textual correspondence, measured by, for example: a) having more than some specified percentage of identical text, b) having the all the same aspects, exclusive of values, c) having the all the same aspects and more than some specified number of the same values associated with those aspects, d) having all the same Entity aspects, irrespective of Attribute aspects or their values, or having all the same Attribute aspects and values, and some amount of the same Entity aspects.

Third, it is possible that some generated stories can have grammatical errors as a result of the above process. As will be seen, the scoring systems that follows, by its nature, does not include any form of grammar checking. Thus, for some optional variants, a grammar checker can be employed prior to or after the scoring process to address such issues. If such an approach is used prior to scoring, then to reduce the amount of processing that needs to be performed, and depending upon the particular implementation variant, some form of grammatical change count can be employed to eliminate or disfavor selection and/or use of certain sentence templates, relative to others that do not (or rarely) need grammar corrections. If used after scoring, a record of the corrections made can be maintained along with the changes, such that the system can learn what changes may need to be made and automatically make them. For example, templates may contain the plural form of a word, like "bedrooms" or "baths" which would be improper if a user specified "1" for either. Thus, the system could learn to recognize that circumstance and automatically delete the plural-denoting "s" from the end when a value is changed from a value of "2" (or more) to a value of "1" and differentiate it from, for example, a situation where the phrase "car garage" appears because it would be grammatically correct no matter what number precedes it.

Finally, with respect to scoring, once a story has been generated, it can be scored, because scoring is performed on a story instance basis. Thus, depending upon the particular implementation and processing capability, one the first story has been generated, story generation and scoring can occur sequentially, they can occur concurrently, or they can overlap in some manner without affecting the results.

Scoring

An example scoring process involves calculation of a set of at least five different scores, intended to "reward" or "punish" stories based upon their content or the corpus units from which they were generated. The five scores are: a geographic score ($S_{geo}$), a distance score ($S_{dist}$), an information content score ($S_{info}$) a replacement score ($S_{replace}$) and an extra aspect score ($S_{extra}$). This set of scores is represented in Equation 1 below:

$$S=[S_{geo},S_{dist},S_{info},S_{replace},S_{extra}] \quad (Eq.1)$$

where S is the set of those scores.

Each of these scores is applied to each story instance ("P") that is made up of a set of sentence templates $t_1, t_2, \ldots, t_n$ as represented in Equation 2 below:

$$P=\{t_1,t_2,\ldots,t_n\} \quad (Eq.2).$$

Calculating Geographic Score ($S_{geo}$)

Since each of the templates that make up a story instance comes from a unit in the corpus that has an associated location, the templates each "inherit" that location as well. Thus, if a corpus unit has a location of 34 Main Street, in originally constructing the corpus, a longitude and latitude pair of values (e.g., longitude, latitude) corresponding to that address is added to the corpus unit. As a result, every template ($t_n$) created from sentences of that same corpus unit (as indicated by its Corpus ID) will have that same pair of longitude and latitude values and will thus be considered to have a location denoted by that longitude and latitude pair (denoted herein for a given template "t" as "t.ll").

Thus, for a given story instance (P) made up of multiple templates, the smallest circle (c) containing all the t.ll points of its constituent templates is determined. This is represented in Equation 3 below:

$$c=\text{smallest\_circle\_enclosing}(\{t.ll:t\in P\}) \quad (Eq. 3).$$

That circle will have a radius denoted herein as c.radius and the geographic score for that story instance will be equal to that radius, as shown in Equation 4 below:

$$S_{geo}=c.radius \quad (Eq. 4).$$

For purposes of understanding, the smaller the radius of the circle, the better. This is because it is presumed that "likes" are more likely to cluster, i.e., similar housing types, similar types of people, similar economic strata of a customer base, etc.

Calculating Distance Score ($S_{dist}$)

The distance score is the only score that is a function of another score, the geographic score ($S_{geo}$). The distance score is a measure of the distance between the center of the circle (c) determined in the first part of the geographic score calculation and the user-specified location, e.g., the property for which the listing is created, the user of the dating program, the location of the store, event or town, etc. That calculation is shown in Equation 5 below:

$$S_{dist}=\|c.\text{center}-\text{input.center}\| \quad (Eq. 5)$$

where c.center is the center of the determined circle and input.center is the location input by the user prior to initiating the story generation.

Calculating Information Content Score ($S_{info}$)

The information content score is a measure of the density of information within the story, specifically, in Equation 6 below, the inverse density of that information. This score effectively looks at how many aspects are contained relative to the number of templates needed to contain those aspects. The score is calculated based upon the total number of templates used in the story instance (denoted "|P|") and the sum of the total number of aspects in each template making up the story instance, as shown in Equation 6 below:

$$S_{info} = \frac{|P|}{\sum_{t\in P}|t\cdot\text{aspects}|}. \quad (Eq. 6)$$

For example, if a story instance required three sentence templates to encompass all of the user inputs, the first template having 2 aspects, the second template having 4 aspects and the third template having 3 aspects, then the numerator of the information content score calculation would be 3 and the denominator would be (2+4+3)=9, yielding an information content score of $S_{info}$=3/9=0.333 for that story instance. Note here that the numerator takes into account all aspects in the template, without regard to whether any or all of them were needed to satisfy the user's input or changed. Thus, if a given sentence template had 3 aspects (for example, doorman, elevator and gym), but only one (gym) was specified or needed based upon the user's input (i.e., doorman and elevator were irrelevant), the count would still be three. Thus, this score does not directly take into account the user inputs at all.

Calculating Replacement Score ($S_{replace}$)

This score takes into account the number and magnitude of the value changes required to modify the values in templates to achieve the values input by the user. For example, a change to 3 bedrooms (user input value=3) from 2 bedrooms (template value=2) or a change of rent value to from the template value of $1,900 to the user input value of $1,700. Each such change is measured on an aspect and value basis and then the product of those is calculated for all templates in the story instance in accordance with Equation 7 below:

$$S_{replace} = \left[ \prod_{aspect \in t, t \in P} \left(1 + \frac{input\ [aspect] \cdot value}{original\_aspect \cdot value}\right) \right]^{-1}. \quad \text{(Eq. 7)}$$

Thus, the effect of this score is to "reward" stories with fewer changes and/or lower-magnitude changes and to "penalize" stories with more changes and/or higher-magnitude changes.

Calculating Extra Aspect Score ($S_{extra}$)

This score measures how much extra information was included in the templates of a story and were not part of the user's input information. The purpose of this score is to "penalize" inclusion of user un-specified aspects in a story instance under the assumption that those things might be important, but not true. As calculated, it also ignores redundancy. For example, in the above example calculating the Information Content Score ($S_{info}$), an example template was noted as having 3 aspects (for example, doorman, elevator, and gym), but only one (gym) was specified by the user's input. This score would "penalize" inclusion of doorman and elevator. Likewise, through the "union" operation, if one template included the "laundry" aspect and another did as well (irrespective of whether laundry was ever specified by a user), only a single instance of the "laundry" aspect would be counted.

The extra aspect score is calculated as the size of the union of the total unique aspects less the total aspects specified by the user's input as specified in Equation 8 below:

$$S_{extra} = \left| \bigcup_{t \in P} t \cdot aspects - input \cdot aspects \right|. \quad \text{(Eq. 8)}$$

Combining the Scores

Once all of the scores are calculated for all story instances, they are all normalized in a conventional manner, on a score-by-score basis, to a common scale, for example, 1 to 10, 1 to 100, or any other normalization scale appropriate or desired for the particular implementation.

Next, a weighting is applied to each score of each story instance and the scores for each instance are combined into a total score for that instance according to Equation 9 below:

$$Score_{Total} = \left( \prod_{i=1}^{5} S_i^{W_i} \right) / |P| \quad \text{(Eq. 9)}$$

where each "i" value denotes a specific score, e.g., $1=S_{geo}$, $2=S_{dist}$, $3=S_{info}$, $4=S_{replace}$, $5=S_{extra}$ and $W_i$ denotes the weight assigned to the score represented by the "i" in Equation 9.

For example, it may be desired that all of the scores: $S_{info}$, $S_{replace}$ & $S_{extra}$ be weighted equally relative to each other, whereas the distance score $S_{dist}$ is considered more important than any one of the $S_{info}$, $S_{replace}$ & $S_{extra}$ scores and the geographic score $S_{geo}$ is considered to be even more important than all of the other scores. Thus, the weights could be assigned as follows:

$W_1=3$ for $S_{geo}$, $W_2=2$ for $S_{dist}$, $W_3=1$ for $S_{info}$, $W_4=1$ for $S_{replace}$, $W_5=1$ for $S_{extra}$ Score "Boost" (Optional)

In addition, in some cases it may be desirable to optionally further apply some kind of "boost" factor to an overall score to take into account some additional factor not handled by the individual scores themselves. This can be performed by adding in a "boost" factor into the total score equation. Depending upon the particular implementation, the boost can be performed by adding some value to a part of the $Score_{Total}$, raising some part of the $Score_{Total}$ to some power or adding in some additional calculation. By way of example, presume that one wanted to "reward" a circumstance where all of the templates in a story instance came from corpus units for properties all in the same zip code (presuming zip code was known and available for each corpus unit, such that it could be inherited by a template derived from that corpus unit) and, in that special case, only, the exponent of the $Score_{Total}$ calculation would be squared. Thus, Equation 9 would be modified to have the form shown in Equation 9A below:

$$Score_{Total} = \left( \prod_{i=1}^{5} S_i^{W_i} \right)^{boost} / |P| \quad \text{(Eq. 9A)}$$

and the "boost" factor would be specified as in Equation 10 below:

$$boost = \begin{cases} 2: t_1 \cdot zip = t_2 \cdot zip \forall\ t_1, t_2 \in P \\ 1: otherwise \end{cases} \quad \text{(Eq. 10)}$$

such that the boost factor would be "2" when, for every combination of pairs of templates making up the story instance, the zip code is the same, but if there is any case where two of the templates come from different zip codes, the boost factor would be "1" (i.e., there would be no boost applied, and the result of Equation 9A would be identical to that of Equation 9).

As a result, once all of the story instances have total scores, the total score for each instance is stored, associated with its respective story instance, again, typically in non-volatile storage. Optionally, the individual scores for each story instance can also be stored, associated with their story instance, if desired.

Figure 6:
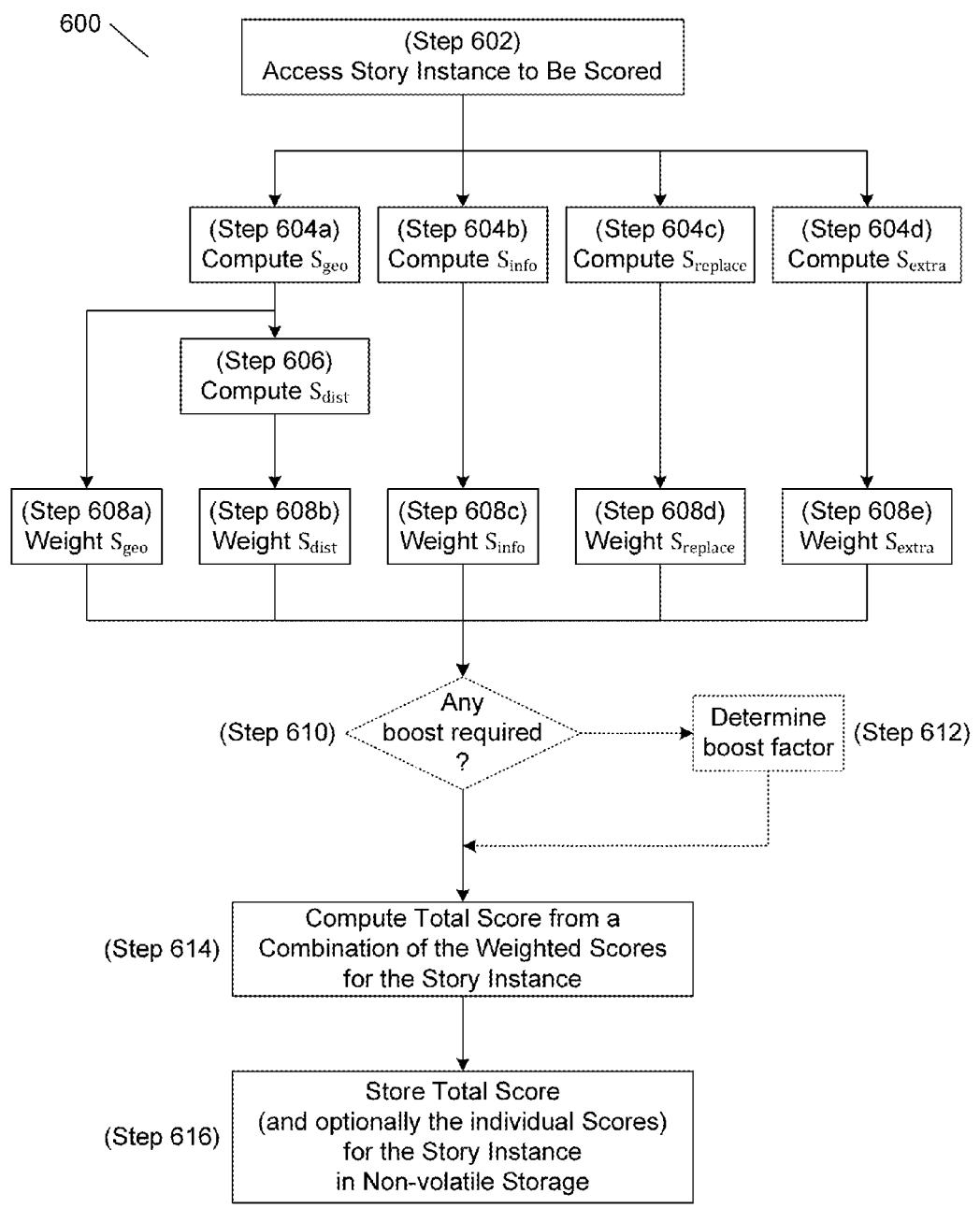
FIG. 6 is a flowchart illustrating, in simplified form, a scoring process as described herein.

FIG. 6 is a flowchart 600 illustrating, in simplified form, a scoring process as described herein. As shown, the process begins with accessing of the story instance to be scored (Step 602). Next, in any order, the geographic score $S_{geo}$ (Step 604a), information content score $S_{info}$ (Step 604b), replacement score $S_{replace}$ (Step 604c) and extra aspect score $S_{extra}$ (Step 604d) are all computed as described above. Once the geographic score $S_{geo}$ is computed, then the distance score $S_{dist}$ is computed (Step 606). After each score has been computed, it is weighted as described above (Steps 608a, 608b, 608c, 608d, 608e). If the variant involves an optional "boost" factor, a determination is then made as to whether it should be applied in computing the total score (Step 610) and, if so, the boost factor is determined (Step 612) and a total score for that story instance is computed (Step 614). If the implementation variant does not involve the boost factor option, then, following completion of the weighting steps (Steps 608a, 608b, 608c, 608d, 608e), the process proceeds directly to computation of the total score for the story instance (Step 614). Once computed, the total score (and optionally the individual scores, pre- or post-weighting) get stored in the non-volatile storage, associated with the story instance to which for it/they pertain for later use.

Ranking

Once all the story instances have had their total scores computed, the story instances are all ranked for display according to their total score, with the "best" total score ranked first, and the rest following in sequential score order. It should be understood however that, depending upon the particular implementation and values used, mathematically, the "best" could be the story with the lowest calculated total score or the highest calculated total score, the important point being that the "best" is ranked first, not value of the score that denotes what constitutes the "best" story. In general, the ranking will be done for all story instances. However, for some implementations, the ranking process can optionally be used to cull out low ranking story instances according to some criteria, for example, if the total scores include at least ten story instances with total scores with a value over "20" then all story instances with total score values in the range of "1" to "9" can be discarded. Likewise, in other implementations, a median total score can be calculated and all story instances with scores below the median can be discarded. In still other implementation variants, due to the exceedingly large number of story instances that could have been generated, the "calculate a median total score value and remove all below" approach can be performed iteratively for a specified number of iterations or until the total number of story instances is less than some number, the important point being that it may be desirable to reduce the number of story instances to some subset containing some number of story instances with the top total scores prior to display, not the approach used to reduce that number.

In still other variants, the user can be allowed to specify that only a certain number ("K") of story instances are to be displayed, in which case the "K" top scored story instances will be displayed.

Display & Selection

Once the ranking is complete, the story instances are displayed to the user 116, for example, in the user interface 300 (of FIG. 3) within the display area 304 in ranked order. Depending upon the particular implementation, the rank and/or total score can be displayed along with the story instance.

As displayed, the user will be given the opportunity to view the displayed story instances and select at least one of them as their preferred story instance(s), for example, by clicking within the area of the display 304 containing that story instance, by selecting an icon or selection item (e.g., check box, radio button, link, etc.) associated with that story, or any other method appropriate for the specific implementation, the important point being the ability of the user to select, not the way in which the selection is indicated or made. Of course, some implementations may be constructed such that a user can only select one instance as their preferred story instance.

Once the user has selected their story instance(s), the selected story instance(s) will be stored in non-volatile storage, either in the system 100 or on some other storage medium provided by the user (for example, a removable storage drive), for later use. Optionally, the user can additionally be given the opportunity to edit a story, for example, to add additional text of their choosing or to modify the text contained in the story to make it more accurate or complete. For example, the selected story instance may refer to "ornate architectural details throughout", but the user may wish to delete the word "throughout" because their particular property only has ornate details in the living room area.

Complete Overview

Figure 7:
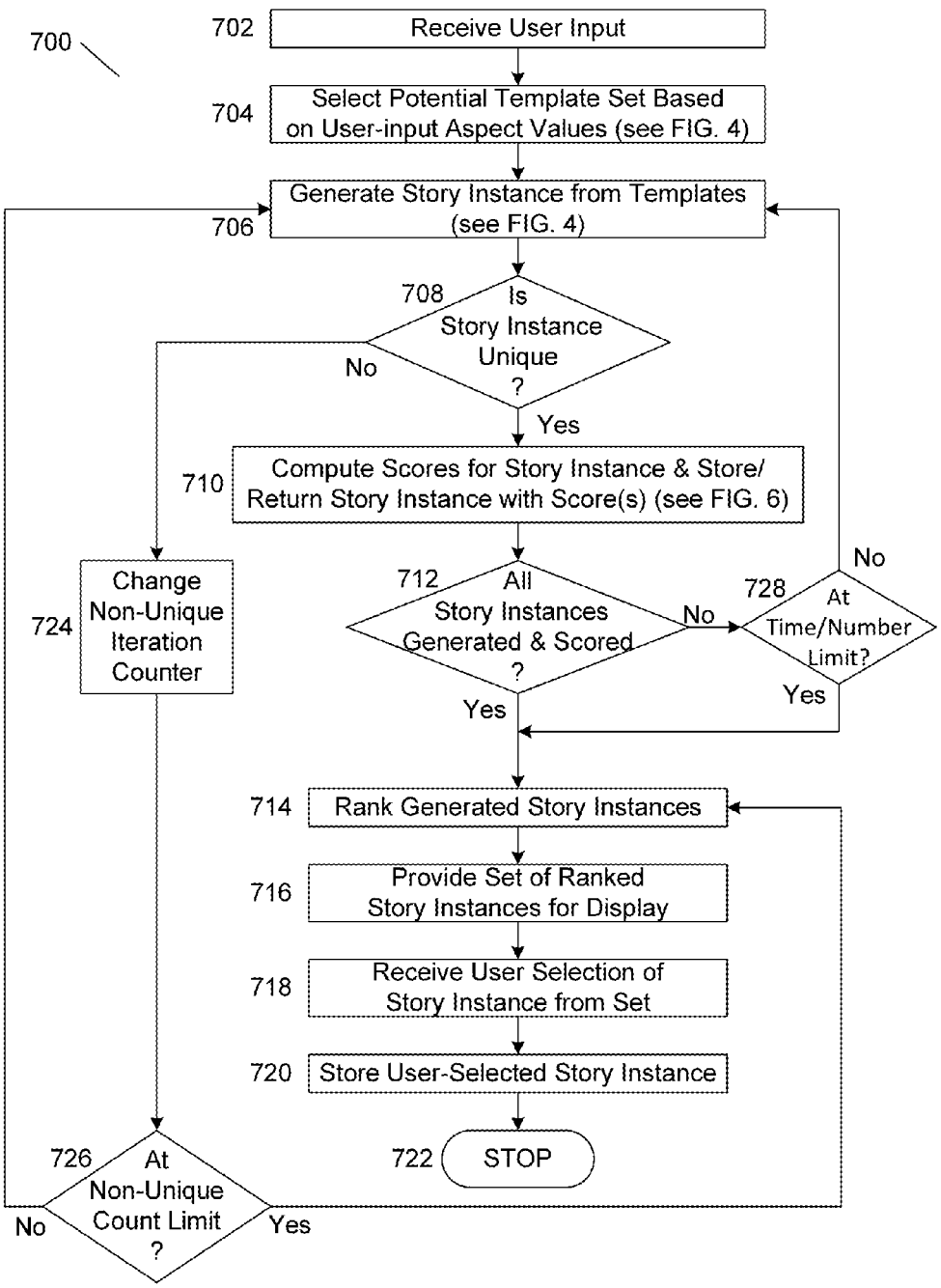
FIG. 7 illustrates, in simplified form, a flowchart for the main components of one variant of the overall process.

Having described the various constituent components involved in the system and methods described herein, the overall process flow will now be provided. FIG. 7 illustrates, in simplified form, a flowchart 700 for the main components of one variant of the overall process with reference to FIGS. 1, 3, 4, and 6 (and portions of their associated descriptions herein).

The process begins with the receipt of input from the user as described herein (Step 702). The system 100 then selects a set of potential templates based upon the aspects input by a user 116 (Step 704) and generates story instances from those templates (Step 706) as described in connection with FIG. 4. Optionally, if the process implements a story instance uniqueness check, the process then checks the generated story instance for identity with all previously-generated story instances (Step 708). If the story instance is unique, then the scores are computed for the story instance, and the generated story instance and scores are stored, as described in connection with FIG. 6 (Step 710).

Next, a determination is made as to whether all possible/allowed story instances have been generated and scored (Step 712). If they have, then the story instances are ranked (step 714) and a set of the ranked story instances is provided (Step 716) for display on the user's screen 130, via, for example, the user interface 300. Following the display, when a user selection of a particular story instance is received (Step 718) the user-selected story instance is stored in non-volatile storage (Step 720) and the process is complete (Step 722).

If however, the uniqueness determination (Step 708) indicates that the story instance is not unique, a non-unique iteration counter is changed (incremented or decremented according to the particular implementation) (Step 724) and a check is done to determine whether too many non-unique story instances have been generated (Step 726). If the limit has not been reached, the process continues to generate story instances (Step 706). If the limit has been reached, the process will then stop generating additional story instances and proceed to the ranking (Step 714) of the story instances that have already been generated and scored.

Alternatively, it is to be understood that the uniqueness determination can be straightforwardly modified and moved so that it is performed based upon the generated story templates, as opposed to using it to check uniqueness of the story instances.

In addition, given the large number of potential story instances that could be generated, some implementations can include a generation limit based upon, for example, time, number of story templates and/or number of instances (Step 728) so that the process does not run for too long. If this is the case, if the limit has not been reached the process continues to generate story instances (Step 706). However, if the limit is reached, the process proceeds to the ranking (Step 714) of the story instances that have already been generated and scored.

Alternatively, it is to be understood that the generation limit can be moved and implemented at the story template generation stage, as opposed to implementing it for story instances, if desired, in a straightforward manner as well.

Finally, it is to be understood that, once a user has selected a particular story instance, that story instance need not be re-saved, but can simply be retained in the non-volatile storage and the other story non-selected instances can optionally be deleted if desired.

Other Variants

Character Counts

At this point it is worth noting that, for certain corpora and implementation variants where the number of characters in an aspect may allow a value judgment to be made, for example, under the presumption that bigger words are better (or worse), the scores involving Entity aspects can be modified such that they count characters making up the Entity aspect as opposed to a simple count of the number of Entity aspects and "reward" or "punish" Entity aspects in accordance with the .character counts. Likewise, those scores can use a combination of character count as a modifier of the particular Entity aspect, e.g., the character count (or some value based upon it) can be used as a boost for that Entity aspect.

De-Weighted Scores

The process described above has also been discussed with reference to use of at least five scores. However, depending upon the particular implementation variant and corpus, it may be the case (in some specialized or atypical circumstances of the corpus and subject matter) that one or two of the distance score ($S_{dist}$ information content score ($S_{info}$), replacement score ($S_{replace}$) and/or an extra aspect score ($S_{extra}$), if included, add little to nothing to the total score. As such, it is to be understood that such score(s) can be de-weighted (weighted to a value less than 1 or even zero). However, it should be understood that at least the geographic score ($S_{geo}$) and at least two of the information content score ($S_{extra}$), replacement score ($S_{replace}$) and/or an extra aspect score ($S_{extra}$), i.e., three individual scores, are required.

Dating—Local Shopping—Local News

Although the process described above has been described in connection with a real estate listing generation example, implementation variants can be constructed using the same process described herein for other location-aware application purposes.

For example, implementation variants can be constructed from a corpus of narrative dating profiles or personal advertisements. The sentence templates would be created form the corpus in the same manner, with the Attribute aspects reflecting things like age, height, weight, address/location, activities, other interests, other preferences, etc., and Entity aspects reflecting things like"funny," "outgoing," "successful," "open minded," "shy," etc.

Still other implementation variants can be constructed from a corpus of advertisements and sales listings, for example, garage/yard sale adds, local store adds, etc. In such variants, the Attribute aspects for the garage/yard sale could include the address and types of items offered for sale, e.g., furniture, tools, clothing, toys, exercise equipment, etc. and for a set of store adds, the specific date(s) for a sale, e.g., "July 4th," "Labor Day," "black Friday. "cyber Monday"), a sale duration limit, e.g., "one day only," a discount amount, e.g., "everything 20% off, etc. The Entity aspects would include the usual puffery or other terms designed to generate interest or excitement.

Yet other implementations can be constructed from a corpus of various types of local news items, for example, police/fire responses, e.g., accidents, burglaries, automobile accidents, fires, ambulance responses, or town events with the Attribute aspects being things like the address or location, the type of call/response, e.g., accident, fire, shoplifting, burglar alarm, time of day, result, number of injured, names of arrested, type(s) of vehicle(s), etc., type of event, e.g., concert, street fair, public hearing, etc., and the Entity aspects including descriptive adjectives appropriate for the circumstances, e.g., "extensive damage," "unhurt," "fun for the family," "surprises," "action-packed," etc.

Thus, it is to be understood that the foregoing process and unique scoring approach can be used in multiple different applications involving NLG techniques to great advantage.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A computerized method for generating and evaluating natural language-generated text, the method comprising:
   receiving, in a computer, data input by a user, the received data to be used to generate multiple different story instances;
   accessing a corpus stored in non volatile storage, using a processor of the computer;
   generating, using a natural language generation technique, multiple instances of text stories based upon both contents of the corpus and the received data;
   analyzing each of the multiple instances of text stories by computing a geographic score using the processor,
      computing a distance score using the processor,
      computing an information content score using the processor,
      computing a replacement score using the processor, and
      computing an extra aspect score using the processor;
   for each of the multiple instances of text stories, normalizing, using the processor, each of the computed geographic score, the computed distance score, the computed information content score, the computed replacement score, and the computed extra aspect score, to a common scale so as to obtain, for each of the multiple instances of text stories, a normalized geographic score, a normalized distance score, a normalized information content score, a normalized replacement score, and a normalized extra aspect score;
   applying, using the processor, a first weighting factor to all of the normalized geographic scores of each of the multiple instances of text stories to obtain weighted geographic scores;
   applying, using the processor, a second weighting factor to all of the normalized distance scores of each of the multiple instances of text stories to obtain weighted distance scores;
   applying, using the processor, a third weighting factor to all of the normalized information content scores of each of the multiple instances of text stories to obtain weighted information content scores;
   applying, using the processor, a fourth weighting factor to all of the normalized replacement scores of each of the multiple instances of text stories to obtain weighted replacement scores;
   applying, using the processor, a fifth weighting factor to all of the normalized extra aspect scores of each of the multiple instances of text stories to obtain weighted extra aspect scores;
   using the processor, computing a total score for each of the multiple instances of text stories from the respective weighted geographic score, weighted distance score, weighted information content score, weighted replacement score, and weighted extra aspect score;

generating, for display on a screen associated with the user, an ordered set of the multiple instances of text stories, using the processor, ranked according to their total score;

receiving from the user, at the processor, a selection of at least one of the displayed instances of text stories in the ordered set;

creating an electronic record in the non-volatile storage containing the selected at least one of the displayed instances of text stories;

employing a grammar checker on the multiple instances of text stories;

maintaining, using the processor, a record of corrections made by the grammar checker;

utilizing the processor to automatically learn, based on the record of corrections, circumstances where corrections were made;

utilizing the processor to determine, based on the learned circumstances, one or more changes to be made to the corpus; and applying, using the processor, the determined changes to the corpus.

2. The computerized method of claim 1:
wherein the corpus comprises multiple real estate advertisements for specific properties each having a coordinate location;
wherein each generated text story instance includes multiple sentence components, each derived from one of the real estate advertisements in the corpus, wherein each of the multiple sentence components inherits the coordinate location of the one of the real estate advertisements from which it is derived; and
wherein the computing the geographic score comprises, for each generated text story instance, computing a minimum radius of a circle that will encompass all of the inherited coordinate locations of its multiple sentence components.

3. The computerized method of claim 2:
wherein the data input by the user includes a desired location; and
wherein the computing the distance score comprises computing a separation distance between a center of the circle and the desired location.

4. The computerized method of claim 1:
wherein the data input by the user includes user-desired aspects and each generated text story instance is constructed using multiple sentence templates each including at least one Attribute aspect; and
wherein the computing the information content score comprises computing how many user-desired aspects are contained in the story instance relative to the number of templates used in that story instance to encompass all the user-desired aspects.

5. The computerized method of claim 1, wherein the generating the multiple instances of text stories comprises:
building each instance of text story, using multiple templates including replaceable aspects, the multiple templates having been derived from units of the corpus, by replacing at least some of the information in the replaceable aspects of the multiple templates with at least some of the data input by the user.

6. The computerized method of claim 5, wherein the computing the replacement score comprises:
determining a count of instances where the data input by the user replaced information in one or more of the multiple templates.

7. The computerized method of claim 5, wherein the part of the information in the multiple templates that is replaceable information has first magnitudes and at least some data input by the user has second magnitudes, and wherein the computing the replacement score comprises:
for all instances of text story where the replaceable information is replaced by data input by the user, quantifying a change between the first magnitudes and the second magnitudes.

8. The computerized method of claim 1:
wherein the computing the total score further comprises determining whether the total score is to include a boost value.

9. The computerized method of claim 1:
wherein the computing the replacement score is performed according to the formula $$S_{replace} = \left[ \prod_{aspect \in t, t \in P} \left( 1 + \frac{\text{input [aspect]} \cdot \text{value}}{\text{original\_aspect} \cdot \text{value}} \right) \right]^{-1}$$

where "input[aspect].value" is a value obtained from the data input by the user and "original_aspect.value" is a value specified within a sentence component of a corpus unit.

10. A computerized method for generating and evaluating natural language-generated (NLG) text, the method comprising:
i) receiving data provided by a user to be used in an NLG story generation process, the user-provided data reflecting aspects desired by the user to be included in a story instance;
ii) generating, using a processor of a computer, a story template, the story template being configured to have sentence templates inserted therein;
iii) repeatedly adding sentence templates, having aspects including values, to the story template, using the processor, based upon aspects specified by the user-provided data until all the aspects have been incorporated;
iv) repeating "ii)" and "iii)" to generate multiple story templates until a generation limit occurs;
v) using the processor, creating story instances by inserting at least some of the values of the aspects in the sentence templates with values specified in at least some of the aspects desired by the user;
vi) scoring each of the story instances according to a set of scores comprising a geographic score, a distance score, an information content score, a replacement score and an extra aspect score;
vii) for each of the story instances, generating a total score as a weighted combination of the geographic score, distance score, information content score, replacement score and extra aspect score, of the respective story instance;
viii) storing the story instances and at least their associated total scores in non-volatile storage using the processor;
ix) ranking the story instances according to their associated total scores using the processor;
x) providing a set of the highest ranked story instances for display to the user using the processor;
xi) receiving a selection of at least one of the provided story instances;

xii) storing that selected at least one of the provided story instances into the non-volatile storage;

xiii) employing a grammar checker on the story instances;

xiv) maintaining, using the processor, a record of corrections made by the grammar checker;

xv) utilizing the processor to automatically learn, based on the record of corrections, circumstances where corrections were made;

xvi) utilizing the processor to determine, based on the learned circumstances, one or more changes to be made to the story template; and xvii) applying, using the processor, the determined changes to the story template.

11. The computerized method of claim 10 further comprising: performing, using the processor, a uniqueness determination.

12. The computerized method of claim 11 wherein the uniqueness determination comprises comparing individual sentence templates against other sentence templates.

13. The computerized method of claim 11 wherein the uniqueness determination comprises comparing, using the processor, individual sentence templates against other sentence templates to identify identical sentence templates.

14. The computerized method of claim 11 wherein the uniqueness determination comprises, as part of "v)", determining, using the processor, whether each newly generated story instance is unique relative to all previously generated story instances.

15. The computerized method of claim 10 further comprising: determining that a generation limit has been reached.

16. The computerized method of claim 15, wherein the generation limit is based upon time.

17. The computerized method of claim 15, wherein the generation limit is based upon a number of repeated story templates.

18. The computerized method of claim 15, wherein the generation limit is based upon a number of story instances generated.

19. The computerized method of claim 10, wherein the generating the total score comprises: incorporating a boost factor in a total score calculation formula.

* * * * *

UNITED STATES PATENT AND TRADEMARK OFFICE
CERTIFICATE OF CORRECTION

PATENT NO. : 9,977,826 B2  
APPLICATION NO. : 14/918605  
DATED : May 22, 2018  
INVENTOR(S) : Micha Gorelick et al.

Page 1 of 1

It is certified that error appears in the above-identified patent and that said Letters Patent is hereby corrected as shown below:

On the Title Page

Under "(*) Notice:", Line 3, after "0 days." delete "days.".

In the Specification

In Column 1, Line 67, add a -- , -- after "can,".

In Column 5, Lines 58-59, delete "60"television." and insert -- 60" television. --, therefor.

In Column 17, Line 48, delete "like"funny,"" and insert -- like "funny," --, therefor.

Signed and Sealed this
Twenty-first Day of August, 2018

Andrei Iancu
*Director of the United States Patent and Trademark Office*